United States Patent [19]
Smith

[11] Patent Number: 5,120,032
[45] Date of Patent: Jun. 9, 1992

[54] MULTI-RATE ANTI-BUCKLING TWISTED ROPE TORSION BAR

[75] Inventor: Jack E. Smith, Dayton, Ohio

[73] Assignee: General Motors Corporation, Detroit, Mich.

[21] Appl. No.: 562,058

[22] Filed: Aug. 2, 1990

[51] Int. Cl.$^5$ ............................................. B60G 11/18
[52] U.S. Cl. ................................... 267/273; 267/148; 267/157; 267/276; 267/284; 267/154
[58] Field of Search ............... 267/273, 276, 279, 281, 267/284, 25, 26, 154, 155, 157, 275, 148, 149; 403/221, 225; 464/97, 51, 183, 147, 173, 181, 179, 7, 57, 155; 280/721, 723; 74/502.5

[56] References Cited
U.S. PATENT DOCUMENTS

| | | | |
|---|---|---|---|
| 906,113 | 12/1908 | Curtis | 464/57 X |
| 1,664,713 | 4/1928 | Strickland | 464/57 |
| 1,897,542 | 2/1933 | West | 464/7 |
| 2,090,174 | 8/1937 | Albright | 464/7 |
| 3,238,808 | 3/1966 | Barnard | 464/57 |
| 3,239,207 | 3/1966 | Camossi | 267/154 |
| 3,814,470 | 6/1974 | Kicher et al. | 267/149 X |
| 3,856,289 | 12/1974 | Steele | 267/154 |
| 3,984,997 | 10/1976 | Dossier | 64/27 R |
| 4,976,417 | 12/1990 | Smith | 267/155 X |
| 4,984,776 | 1/1991 | Smith | 267/154 X |
| 5,000,430 | 3/1991 | Smith | 267/154 X |
| 5,009,405 | 4/1991 | Smith | 267/273 |

Primary Examiner—Douglas C. Butler
Attorney, Agent, or Firm—Ronald L. Phillips

[57] ABSTRACT

A tube received about a twisted rope torsion bar prevents buckling of the latter and also acts to increase the spring rate.

2 Claims, 2 Drawing Sheets

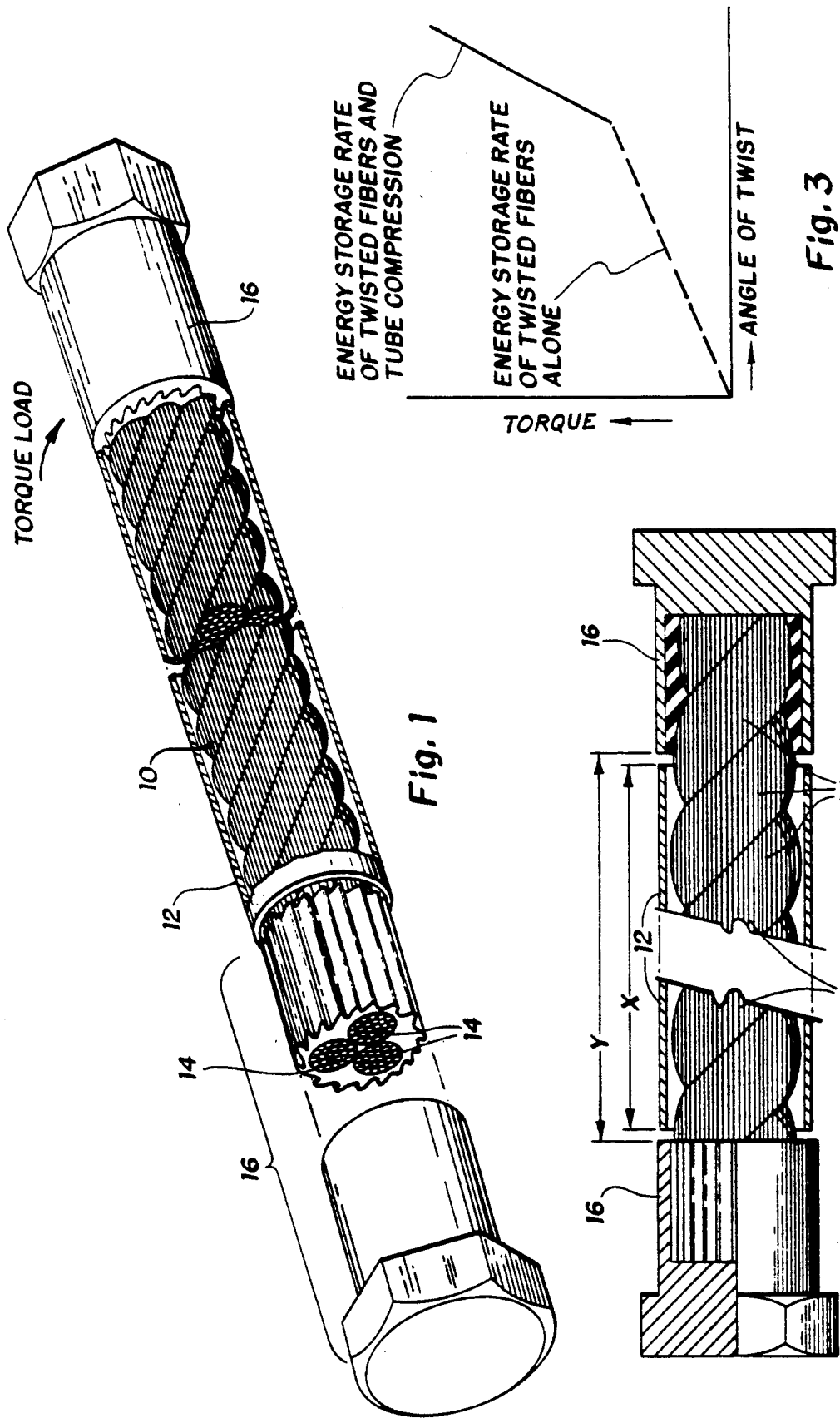

MULTI-RATE ANTI-BUCKLING TWISTED ROPE TORSION BAR

TECHNICAL FIELD

This invention relates to twisted rope torsion bars and more particularly to the spring rate and buckling thereof

BACKGROUND OF THE INVENTION

In an effort to reduce space requirements and weight, eliminate corrosion and improve permanent set resistance as well as fatigue life, it has been proposed that fiber reinforced plastic with its higher strength-to-weight ratio be used as a replacement for steel in torsion bars used in motor vehicle suspension systems. However, several major problems exist when a conventional bundle of fiber strands coated with plastic resin is used to make a replacement torsion bar as contrasted with a leaf spring. For example, the fiber strands are readily adapted in a straight lay arrangement to resist the bending stresses in tension in a leaf spring configuration. But in the case of a torsion bar, there is a torsional component that would be resisted by just the strength of the plastic when straight laid resin impregnated fiber strands are used in their construction. Fiber reinforced plastic is not normally a homogenous material like steel And in the case of straight laid fiber strands, it effectively has only the much lower strength of the plastic resin to resist the torsional component on the bundle of strands when shaped and cured in the form of a straight bar. Moreover, because fiber reinforced plastic has a much lower modulus of elasticity than steel, a cross section of the former must normally be larger in diameter than the steel bar for equivalent strength. It was thought that the resin strength problem could be overcome if the resin impregnated fibers were braided at ±45° angle into a tubular cross section and then laid straight to form a torsion bar; the premise here being that the cross section would act more like a homogeneous material. However, this presents substantial processing problems while still requiring a much larger cross section than steel to obtain equivalent strength. A better solution is to form the torsion bar from twisted strands of resin coated fibers that have been laid in a rope forming manner in a lay direction so that the strands always tend to wind further on themselves in reaction to the torsional loading, i.e., unidirectional torsional loading. However, while this approach significantly reduces the required cross section, the diameter-to-length ratio can then become a limiting factor as there is a ratio below which spiral buckling rather than the shear or tensile strength of the fibers determines the load limit.

It is known that the buckling problem could be solved in a very simple low cost manner by the addition of a thin anti-buckling tube about the twisted rope form of torsion bar. In such an arrangement, the anti-buckling tube extends to near the ends of the torsion bar leaving the latter free for connection in a suspension system, the tube itself not being rigidly attached in any way to the torsion bar or any other suspension component. To the contrary, there is provided a small radial clearance between the torsion bar and tube to assure that it is not a factor in the torque transmission. It was found that the amount of side force on the torsion bar required to prevent its spiral buckling is very small compared to the torsional force that can be withstood and this factor together with no torsional load requirement allows the tube to have a very thin wall.

With the addition of such a thin wall tube to a twisted rope form of torsion bar having a diameter-to-length ratio normally too low for a certain load application, any tendency to buckle by spiraling at what would otherwise be an overload is prevented by the surrounding constraint of the tube interior. That is, the tube holds the twisted rope torsion bar essentially straight while not allowing the tube to enter into the torque transmission because of slippage between the outer helical rope surface and the inner cylindrical tube surface.

Thus, the addition of the anti-buckling tube allows the use of a twisted rope torsion bar with a diameter-to-length ratio substantially smaller than that normally required. As a result, the anti-buckling tube offers the advantage of improved material efficiency (less material required) for a twisted rope torsion bar. Moreover, because the anti-buckling loads are very small and no torque transmission is carried by the anti-buckling tube, the tube itself can be made of low strength material (metal or plastic).

SUMMARY OF THE PRESENT INVENTION

The present invention provides a new additional use of the above anti-buckling tube without imposing any significant penalties on its anti-buckling characteristics by employing the tube in a way to effect a varying spring rate in the composite twisted strand torsion bar. This is very simply accomplished from having found that such a torsion bar shortens in length as the fibers wind up and compress while, of course, storing energy in the process. In the present invention, the anti-buckling tube, rather than being located always free of connection with the torsion bar, is instead strategically located to come in contact with the torsion bar through its end attachments at a prescribed reduction in torsion bar length (i.e., torsion bar load) within its operating range. Thereafter, additional torque and torsion bar shortening is also resisted and energy is stored in the compression of the tube that then results and in the added strain on the torsion bar in the form of tensile loading.

The spring rate effected by the anti-buckling tube can also be either multi-stepped or made infinitely variable by simply varying the construction of the tube. For example, the former can be provided by simply forming the tube with a stepped cross section along its length such that the compressive strength of the tube varies along its length to produce a multistep variable rate. Another way of providing a multistep rate is to form the tube as a series of thin concentric tubes of progressively shorter length such that they progressively take the compressive load as the torsion bar shortens. On the other hand, an infinitely variable rate torsion bar results from simply forming the anti-buckling tube with a tapered thickness along its length.

These and other objects, advantages and features of the present invention will become more apparent from the following description and drawings in which:

BRIEF DESCRIPTION OF THE DRAWINGS

FIG. 1 is an isometric view with parts exploded and broken away of a multi-rate anti-buckling twisted rope torsion bar construction according to the present invention.

FIG. 2 is a side view with parts in section and broken away of the torsion bar construction in FIG. 1.

FIG. 3 is a graph illustrating the spring rate of the torsion bar construction in FIGS. 1 and 2.

DESCRIPTION OF PREFERRED EMBODIMENT

Figure 4:
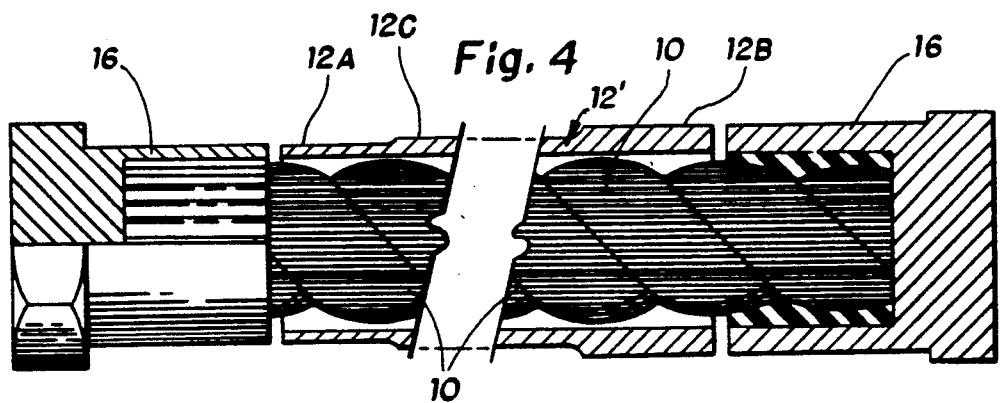
FIG. 4 is a view similar to FIG. 2 but showing another embodiment of the torsion bar construction according to the present invention.

Referring to FIGS. 1 and 2, there is shown a twisted rope torsion bar 10 constrained by a surrounding tube 12 against buckling The torsion bar comprises a plurality (three shown) of plastic resin impregnated strands 14 of unidirectionally twisted, all similarly angled, continuous fibers laid together in a rope forming manner so that all the strands tend to wind further on each other to utilize the tensile strength of all the fibers on loading the torsion bar in one only predetermined direction. The anti-buckling tube 12 which is of uniform thickness with constant inner and outer diameters extends substantially the length of the torsion bar 10 and operates to constrain same against buckling by the torsion bar contacting the cylindrical interior of the tube at the points of buckling tendency, the tube and torsion bar having a radial clearance therebetween small enough to maintain the torsion bar essentially straight while allowing slippage between the tube and the torsion bar so that the tube does not enter into torque transmission by the torsion bar, but yet can sustain compressive loading as will be described later to effect a variable spring rate in the torsion bar. The torsion bar is adapted to spring a mass such as that in a vehicle suspension system and, for that purpose, has end attachments 16 such as of the type disclosed in U.S. Pat. No. 4,984,776 entitled "End Attachment Assembly for a Twisted Rope Torsion Bar" and assigned to the assignee of this invention and hereby incorporated by reference.

In the embodiment in FIGS. 1 and 2, and according to the present invention, the length X of the tube 12 at zero (0) torsional load (or a preset torsional preload) is made less than the distance Y between the end attachments 16 according to the magnitude of the load or deflection at which the spring rate is desired to be changed (increased). Moreover, the tube preferably has a compressibility comparable to the degree of torsional resistance of the rope construction. With the torsion bar connected, for example, in a moor vehicle suspension system, and as the torsion bar is torqued, the torsion bar stores energy at one rate and shortens a certain degree in length as indicated by the dash line in the FIG. 3 graph. The clearance or difference between the X and Y dimension is set so that when the torque and the associated reduction of length reach a certain point, the end attachments come into contact with the ends of the tube. Thereafter, additional torque and resulting bar shortening is now resisted and energy is stored in the compression of the tube and in added strain on the torsion bar in the form of tensile loading. This is depicted by the solid line in the FIG. 3 graph.

In summary then, and as can be seen in the graph, as the torque increases the energy storage rate is linear at one rate as energy is stored in just the twisted fibers alone, but when the end supports bottom on the tube end, the energy storage rate is then that of the twisted fibers and the tube compression acting together whereby there is produced a much higher rate which again is linear but increases dramatically with the angle of twist. This is often a desirable characteristic for a suspension system, i.e., a spring rate that increases with deflection to best isolate certain vibrations.

Where a smoother transition is desired between low and high torsion bar spring rates, there is provided an anti-buckling tube 12' as shown in FIG. 4 that has a stepped outer diameter cross section along its length such that the compressive strength of the tube varies along its length. In the embodiment shown, there is a small outer diameter section 12A, a large outer diameter section 12B, and an intermediate outer diameter section 12C therebetween. There are thus two (2) steps in the tube section which together with the preset tube end gap(s) produce a quadruple rate.

Figure 5:
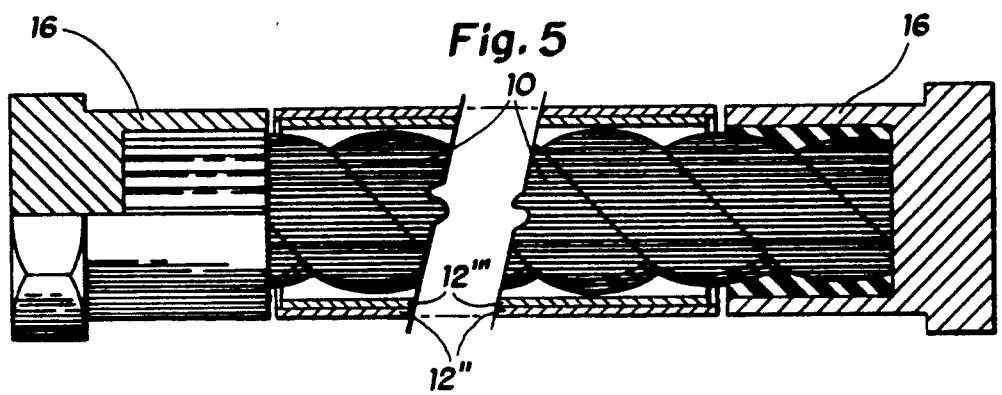
FIG. 5 is a view similar to FIG. 2 but showing another embodiment of the torsion bar construction according to the present invention.

Another embodiment providing a multiple step variable rate is shown in FIG. 5 wherein a series of thin concentric tubes 12" and 12'" are used in lieu of a single tube and are made progressively shorter than the next tube. As a result, compression of the longest tube into the length of the next longest tube results in a rate increase, with this rate continuing to build in steps as each successive tube is engaged into compression. In the embodiment shown, there are two tubes but it will be understood that more tubes of progressively shorter length can be added to progressively increase the spring rate.

Figure 6:
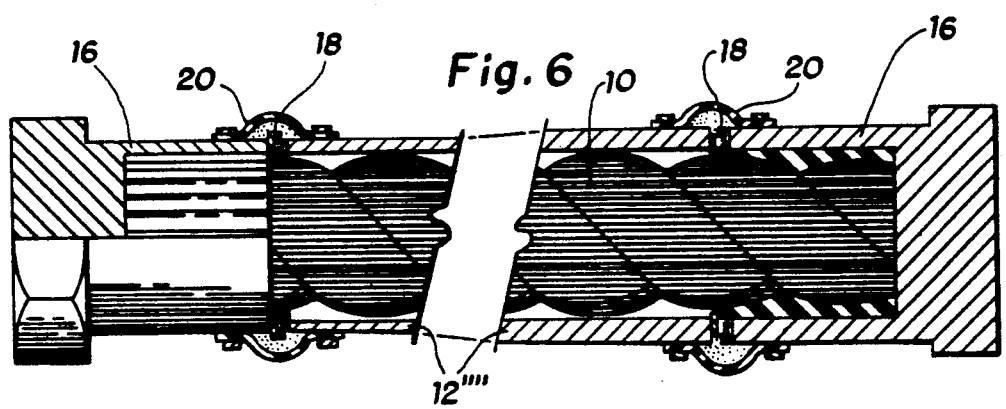
FIG. 6 is a view similar to FIG. 2 but showing another embodiment of the torsion bar construction according to the present invention.

At the other extreme, the torsion bar can be provided with an infinitely variable rate as shown by the embodiment in FIG. 6. In this embodiment, the singular tube 12'" is simply provided with a tapered thickness tubular cross section along its length to produce the infinitely variable rate torsion bar desired.

Moreover, it may be desirable in certain applications to reduce the friction between the twisted rope torsion bar end attachments and the compression tube. And for that purpose, there may be provided anti-friction thrust bearings 18 between the tube ends and the bar attachment ends as shown in the FIG. 6 embodiment. Furthermore, lubricant may be added to the inside of the tube(s) to assure that no wear occurs on the rope or tube as the torsion bar is worked at various levels of torque. In that case, elastic seals 20 are provided on each of the tubes to retain the lubricant and preclude dirt as shown in the FIG. 6 embodiment.

The foregoing description of the preferred embodiments of the invention have been presented for purposes of illustration and description. It is not intended to be exhaustive or to limit the invention to the precise forms disclosed. Obvious modifications or variations are possible in light of the above teachings. For example, the above anti-buckling tube concept could be applied to a twisted rope torsion bar that is without the resin impregnation. The embodiments were chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. In combination, a twisted rope torsion bar adapted for unidirectional loading only, said torsion bar including a pair of ends and having a predetermined length with a least one point of buckling tendency located therealong, attachment means at each end of said torsion bar, said torsion bar comprising a plurality of strands of unidirectionally twisted all similarly angled continuous fibers laid together in a rope forming manner so that all the strands tend to wind further on each other on loading of the torsion bar in one only predetermined direction, tube means including an interior received about and extending substantially the length of said torsion bar between said attachment means for constraining said torsion bar against buckling by said torsions bar contacting the interior of said tube at the point of buckling tendency, and said tube means having a prescribed end-wise relationship with said two attachment means for contacting with same at a prescribed torque load on said torsion bar so that additional torque load is resisted in compression by said tube means and in added strain on said torsion bar.

2. In combination, a twisted rope torsion bar adapted for unidirectional loading only, said torsion bar including a pair of ends and having a predetermined length with a least one point of buckling tendency located therealong, attachment means at each end of said torsion bar, said torsion bar comprising a plurality of strands of unidirectionally twisted all similarly angled continuous fibers laid together in a rope forming manner so that all the strands tend to wind further on each other on loading of the torsion bar in one only predetermined direction, tube means including an interior received about and extending substantially the length of said torsion bar between said attachment means for constraining said torsion bar against buckling by said torsion bar contacting the interior of said tube at the point of buckling tendency, and said tube means having a prescribed end-wise relationship with said two attachment means for contacting with same at a prescribed torque load on said torsion bar so that additional torque load is resisted in compression by said tube means and in added strain on said torsion bar to effect a multiple spring rate that increases with torque load.

* * * * *